United States Patent [19]
Kolb et al.

[11] Patent Number: 4,900,076
[45] Date of Patent: Feb. 13, 1990

[54] IMPACT ABSORBING CONSTRUCTION FOR A VEHICLE

[75] Inventors: Wolfgang Kolb, Sennfeld; German Schmitt, Schweinfurt, both of Fed. Rep. of Germany

[73] Assignee: Fichtel & Sachs AG, Schweinfurt, Fed. Rep. of Germany

[21] Appl. No.: 212,869

[22] Filed: Jun. 29, 1988

[30] Foreign Application Priority Data

Jul. 16, 1987 [DE] Fed. Rep. of Germany ....... 3723467

[51] Int. Cl.$^4$ ............................................ B60R 19/02
[52] U.S. Cl. .................... 293/132; 267/116; 293/155; 403/205
[58] Field of Search ............... 293/132, 134, 155, 154; 267/116, 120, 139; 403/200, 205, 233, 235, 403

[56] References Cited

U.S. PATENT DOCUMENTS

| | | | |
|---|---|---|---|
| 435,156 | 8/1890 | Schmemann | 403/205 X |
| 3,313,567 | 4/1967 | Sturman | 293/132 |
| 3,431,005 | 3/1969 | Priefert | 293/155 X |
| 4,160,561 | 7/1979 | Farnam et al. | 293/155 X |
| 4,770,453 | 9/1988 | Reynolds | 293/132 X |

FOREIGN PATENT DOCUMENTS 2903542 8/1980 Fed. Rep. of Germany ...... 293/155

*Primary Examiner*—Andres Kashnikow
*Assistant Examiner*—Matthew C. Graham
*Attorney, Agent, or Firm*—Brumbaugh, Graves, Donohue & Raymond

[57] ABSTRACT

An impact absorbing construction for a motor vehicle comprises an impact damping cylinder. One end of said impact damping cylinder is adapted for being fastened to a vehicle structure. The other end of the impact damping cylinder is connectable with a bumper. The bumper is adjustable with respect to the impact damping cylinder. In order to allow both a horizontal and a vertical adjustment, a sleeve is provided having a sleeve axis which is perpendicular to the cylinder axis. A core is received by the sleeve. The core is adjustable along the sleeve axis by screwing. The bumper is fixable to the core. A sleeve support is fastened to the sleeve. The sleeve support is connectable with the other end of the damping cylinder and is adjustable with respect to the damping cylinder along the cylinder axis.

18 Claims, 2 Drawing Sheets

IMPACT ABSORBING CONSTRUCTION FOR A VEHICLE

BACKGROUND OF THE INVENTION

In modern motor vehicles impact absorbing constructions are increasingly introduced for damping relatively small impact forces which may occur when a motor vehicle impacts slightly against an end wall of a garage or against another motor vehicle in a parking area. These impact absorbing constructions must be adapted in motor car manufacturing to the respective vehicle structure.

STATEMENT OF THE PRIOR ART

It is known to provide impact absorbing constructions in which the bumper can be adjusted in vertical direction such that the bumper is always brought to a predetermined position above ground. The inventors have found out that it was desirable to provide also a horizontal adjustment of the bumper with respect to the motor vehicle structure such as to take into account various forms and sizes of motor vehicle body shells.

OBJECT OF THE INVENTION

It is an object of the present invention to provide an impact absorbing construction for a vehicle, which allows both vertical and horizontal adjustment of a bumper with respect to a motor vehicle structure.

SUMMARY OF THE INVENTION

An impact absorbing construction for a vehicle comprises at least one impact damping cylinder unit having a cylinder axis and two ends. One of said two ends is adapted for being fastened to a vehicle structure and the other of said two ends is connectable with a bumper element by adjustable connection means. The adjustable connection means comprise a sleeve member having a sleeve member axis substantially prependicular to said cylinder axis, and a core member within the sleeve member. The core member is adjustable along said sleeve member axis by thread engagement means. The bumper element is fixable to the core member and is vertically adjustable by adjustment of the core member with respect to the sleeve member. Such the height of the bumper element above ground can be adjusted. A sleeve support member is fastened to the sleeve member. The sleeve support member is connectable with the other end of the damping cylinder unit and is adjustable with respect to the damping cylinder unit along the cylinder axis, so that horizontal adjustment of the bumper is possible with respect to the motor vehicle structure. In most cases it will be desirable to adjust the longitudinal position of the bumper along the long horizontal axis of the motor vehicle, i.e. in driving direction.

Various possibilities are disclosed by the inventors for adjustable connection, which allow both easy vertical and horizontal adjustment.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to embodiments shown in the accompanying drawings, in which.

DESCRIPTION OF THE PREFERRED EMBODIMENTS

Figure 1:
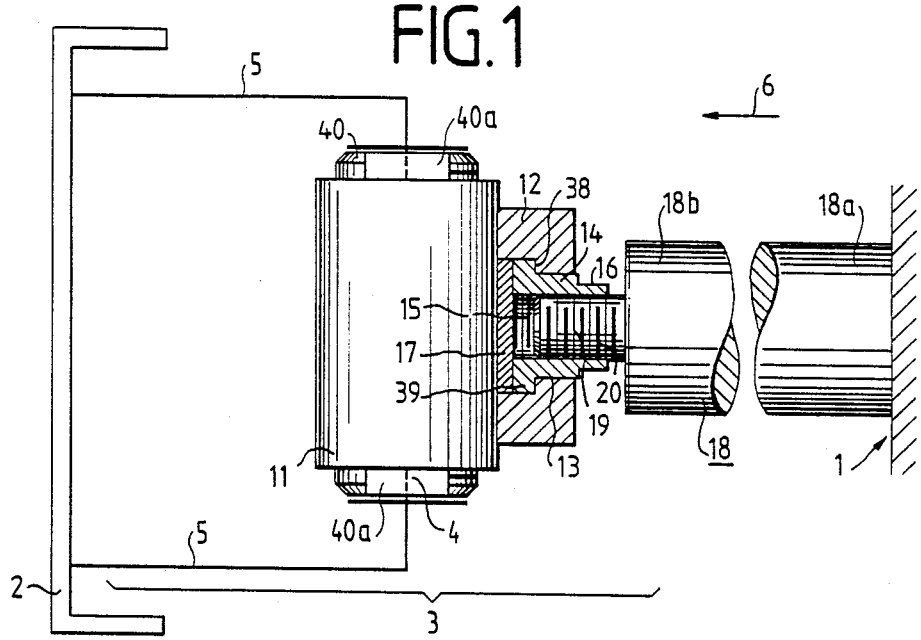
FIG. 1 is a side view partially in section of an impact absorbing construction of a vehicle.

In FIG. 1 a motor vehicle structure is schematically illustrated and indicated at 1. Two impact cylinder units 18 are fastened to the motor vehicle structure 1 by usual fastening means such as by welding or by screw fastening means. The damping cylinder units 18 may be of the type as disclosed in U.S. Pat. No. 3,944,270.

While the right-hand end 18a of a damping cylinder unit 18 is fastened to the motor vehicle structure 1, the left-hand end 18b of the damping cylinder unit is connected with a bumper 2 by adjustable connection means.

The adjustable connection means 3 comprise a sleeve member 11 with internal thread means. A core sleeve 40 with external thread means is vertically adjustable with respect to the sleeve member 11 by screwing. In order to facilitate screwing the core sleeve 40 is provided with tool engagement faces 40a. A connection pin 4 passes through the core sleeve 40 and is axially fixed but rotatable with respect to the core sleeve 40. The connection pin 4 is connected by connection rods 5 with the usual bar-shaped bumper 2. The driving direction of the vehicle is indicated by an arrow 6.

A sleeve support member 12 is welded to the sleeve member 11. This sleeve support member 12 is provided with a bore 13 having bore sections of different diameters. At the transition between two subsequent bore sections a shoulder face 38 is formed. An annular connecting member 14 is rotatably received within the bore 13. The annular connecting member 14 has a radially outwardly directed flange 39 which is in axial engagement wit the shoulder face 38. A disc member 17 is provided between the annular connecting member 14 and the outer peripheral face of the sleeve member 11. This disc member 17 serves to prevent a welding of the annular connecting member 14 against the sleeve member 11 when the sleeve support member 12 is welded to the sleeve member 11. So the annular connecting member 14 is axially fixed but freely rotatable with respect to the sleeve support member 12. The annular connecting member 14 is provided with internal thread means. These internal thread means 15 are in thread engagement with external thread means 20 of a pin 19, which pin is fastened to the left-hand end 18b of the damping cylinder unit 18. The annular connecting member 14 is provided with tool engagement faces 16 which allow the annular connecting member 14 to be turned. By turning the annular connecting member 14 the longitudinal position of the sleeve member 11 with respect to the left-hand end 18b of the damping cylinder unit 18 may be adjusted. Such the bumper 2 can be adjusted with respect to the body shell of the respective motor vehicle.

Figure 2:
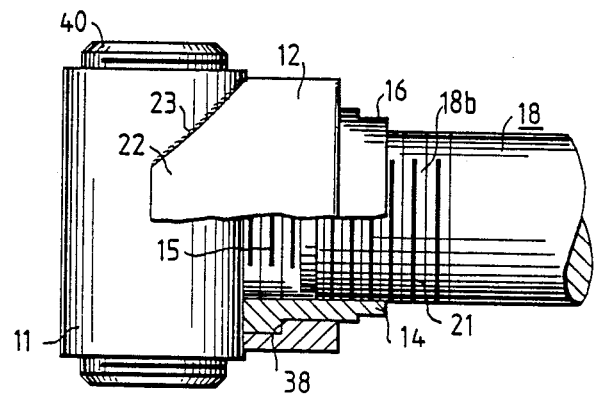
FIG. 2 is a modified embodiment of the horizontal adjustment means.

The embodiment of FIG. 2 differs from the embodiment of FIG. 1 in that the sleeve support member 12 has a concave contact face contacting the outer peripheral face of the sleeve member 11. Along the edges of said contact face welding seams 23 are provided. With other words: The sleeve support member 12 is provided with two fork-shaped extensions 22 which partially encompass the sleeve member 11. A further deviation from the embodiment of FIG. 1 is that external thread means 21 are immediately provided on the circumferential face of the damping cylinder unit 18 adjacent to the left-hand end 18b thereof.

Figure 3:
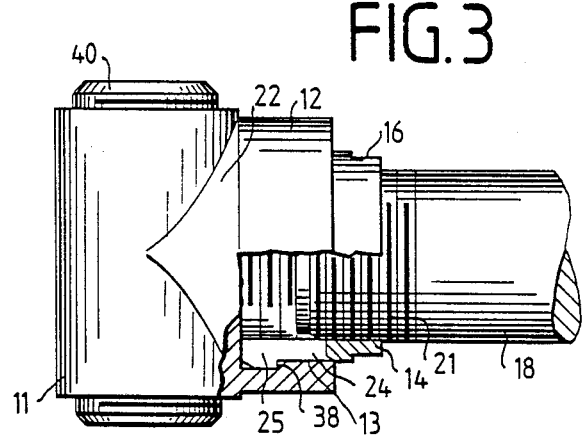
FIG. 3 is a further modified embodiment of the horizontal adjustment means.
Figure 4:
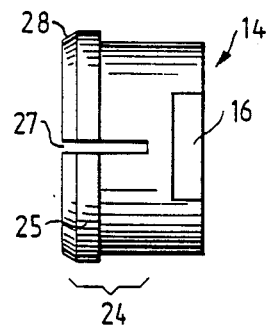
FIG. 4 is a detail of FIG. 3.

In the embodiment of FIG. 3 the sleeve support member 12 is similarly shaped as in FIGS. 1 and 2. The annular connecting member 14, however, is modified, as particularly shown in FIG. 4. This annular connecting member 14 is provided with axial slots 27 along an axial section 24. Moreover, the flange 25 is provided with a chamfered insertion surface 28. The annular connecting member 14 may be inserted into the bore 13 from the right, as seen in FIG. 3. The left-hand end section 24 of the annular connecting member 14 is elastically restricted in radial direction when the chamfered insertion face 28 passes along the exit edge of the bore 13. On full insertion of the annular connecting member 14 into the bore 13, the flange 25 snaps behind the shoulder 38. Now the damping cylinder unit 18 with its external thread means can be screwed into the internal thread means of the annular connecting member 14. The axial adjustment can be obtained again by turning the annular connecting member 14 by the turning tool engaging the faces 16.

Figure 5:
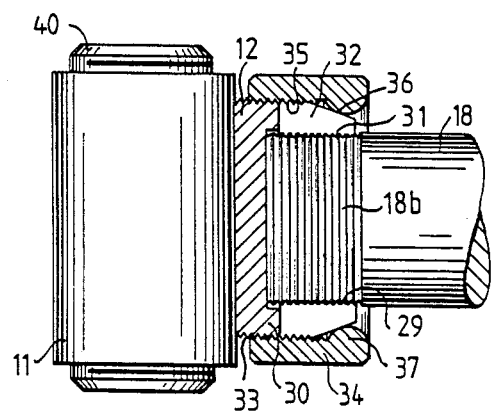
FIG. 5 is a further modified embodiment of the adjustment means.

In the embodiment of FIG. 5 the sleeve support member 12, which is again welded or adhesively bonded to the sleeve member 11, is shaped as a collet by axial slots. By these axial slots gripper elements 32 have been obtained, which are distributed about the circumference of the damping cylinder 18 at the left-hand end 18b thereof. These gripper elements 32 can be deflected radially inwards such as to grippingly engage thread means or groove means 29 of the damping cylinder unit 18. The radially inner aces of the gripper elements 32 are provided with corresponding groove means 31. A screw cap 34 with inner thread means 35 is screwed onto external thread means 33 of the sleeve support member 12. This screw cap 34 is provided with an inwardly projecting bulge 37 which engages chamfered external faces 36 of the gripper element 32. By screwing the screw cap 34 leftwards, the gripper elements 32 are brought into fastening engagement with the damping cylinder unit 18. For axial adjustment of the sleeve member 11 with respect to the damping cylinder unit 18, the screw cap 34 is released so that the gripper elements 32 come out of engagement with the groove means 29 and the sleeve member can be axially shifted with respect to the damping cylinder unit 18, whereupon the screw cap 34 can be tightened again. The sleeve support member 12 of all embodiments can be made of steel, die-cast metal, particularly die-cast aluminium, malleable cast iron and spheroidal graphite iron. The sleeve support member can be integral with the sleeve member 11. This is particularly true for the embodiment of FIG. 3.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. An impact absorbing construction for a vehicle comprising at least one impact damping cylinder unit (18) having a cylinder axis and two ends (18a, 18b), one (18a) of said two ends being adapted for being fastened to a vehicle structure (1) and the other (18b) of said two ends being connectable with a bumper element (2) by adjustable connection means (3), said adjustable connection means (3) comprising a sleeve member (11) having a sleeve member axis substantially perpendicular to said cylinder axis, a core member (40) within said sleeve member (11), which core member (40) is adjustable along said sleeve member axis by thread engagement means, said bumper element (2) being fixable to said core member (40), a sleeve support member (12) being fastened to said sleeve member (11), an annular connecting member (14) being rotatably mounted within said sleeve support member (12) about a connecting member axis perpendicular to said sleeve member axis, said annular connecting member (14) being rotatable but axially and radially fixed with respect to said sleeve support member (12) along said connecting member axis, said annular connecting member (14) having internal thread means (15), said internal thread means (15) of said annular connecting member (14) being in engagement with external thread means (20) provided at said other end (18b) of said damping cylinder unit (18) thereby allowing said damper cylinder unit to be horizontally adjustable with respect to said sleeve support member and sleeve member.

2. An impact absorbing construction as set forth in claim 1, wherein said sleeve support member (12) is welded to said sleeve member (11).

3. An impact absorbing construction as set forth in claim 2, wherein said sleeve support member (12) has a concave contact face adapted to an external circumferential face of said sleeve member (11), said sleeve support member (12) being welded to said sleeve member (11) along edge lines (23) of said concave contact surface.

4. An impact absorbing construction as set forth in claim 1, wherein said annular connecting member (14) is provided with a radially outwardly directed flange (39), said radially outwardly directed flange (39) being in axial engagement with a shoulder face (38) of a bore (13) of said sleeve support member (12).

5. An impact absorbing construction as set forth in claim 4, wherein said annular connecting member (14) is slotted along a section (24) thereof accommodated within said sleeve support member (12), said slots (27) permitting an elastic diameter restriction of said slotted section (24) when introducing said section of said annular connecting member (14) into said bore (13) of said sleeve support member (12), said flange (25) snapping behind said shoulder face (38) after full insertion of said section of said annular connecting member (14) into said bore (13) of said sleeve support member (12).

6. An impact absorbing construction as set forth in claim 5, wherein said section (24) of said annular connecting member (14) is provided with a tapered insertion face (28).

7. An impact absorbing construction as set forth in claim 1, wherein said external thread means (21) is provided on an external face of said damping cylinder unit (18).

8. An impact absorbing construction as set forth in claim 1, wherein said sleeve support member (12) accommodates a disc member (17) interposed between an outer face of said sleeve member (11) and an opposite end face of said annular connecting member (14).

9. An impact absorbing construction as set forth in claim 1, wherein said external thread means (20) is provided on an extension bolt (19) of said damping cylinder unit (18), said extension bolt (19) having reduced diameter as compared with the diameter of said damping cylinder unit (18).

10. An impact absorbing construction as set forth in claim 1, further comprising two damping cylinder units (18) connected by respective adjustable connection means (3) with a common bumper bar (2).

11. An impact absorbing construction as set forth in claim 1, wherein said annular connecting member (14) is provided with adjusting tool engagement faces (16).

12. An impact absorbing construction as set forth in claim 1, wherein said core member (40) is a hollow core member.

13. An impact absorbing construction as set forth in claim 12, wherein said hollow core member (40) receives a connecting pin (4) axially fixed with respect to said core member (40), said bumper element (2) being connectable with said connecting pin (4).

14. An impact absorbing construction for a vehicle comprising at least one impact damping cylinder unit (18) having a cylinder axis and two ends (18a, 18b), one (18a) of said two ends being adapted for being fastened to a vehicle structure (1) and the other (18b) of said two ends being connectable with a bumper element (2) by adjustable connection means (3), said adjustable connection means (3) comprising a sleeve member (11) having a sleeve member axis substantially perpendicular to said cylinder axis, a core member (40) within said sleeve member (11), which core member (40) is adjustable along said sleeve member axis by thread engagement means, said bumper element (2) being fixable to said core member (40), a sleeve support member (12) being fastened to said sleeve member (11), said sleeve support member (12) being provided with a plurality of circularly arranged gripper elements (32) surrounding an external face provided at said damping cylinder unit (18) adjacent to said other end (18b) thereof, and a screw cap (34) being engageable in thread engagement with said sleeve support member (12), wherein said screw cap (34) acts onto said gripper elements (32) such as to radially engage said gripper elements (32) with said external face thereby allowing said damper cylinder unit to be horizontally adjustable with respect to said sleeve support member and sleeve member.

15. An impact absorbing construction as set forth in claim 14, wherein said external face and said gripper elements (32) is provided with inter-engaging profiles (29, 31).

16. An impact absorbing construction as set forth in claim 14, wherein said screw cap (34) is provided with a radially inwardly directed bulge (37), said bulge (37) engaging chamfered radially outer faces (36) of said gripper elements (32).

17. An impact absorbing construction as set forth in claim 14, wherein said gripper elements (32) are integral with said sleeve support member (12) and being obtained by axially extending slots in a tube-shaped section of said sleeve support member (12).

18. An impact absorbing construction for a vehicle comprising at least one impact damping cylinder unit (18) having a cylinder axis and two ends (18a, 18b), one (18a) of said two ends being adapted for being fastened to a vehicle structure (1) and the other (18b) of said two ends being connectable with a bumper element (2) by adjustable connection means (3), said adjustable connection means (3) comprising a sleeve member (11) having a sleeve member axis substantially perpendicular to said cylinder axis, a core member (40) within said sleeve member (11), which core member (40) is adjustable along said sleeve member axis by thread engagement means, said bumper element (2) being fixable to said core member (40), a sleeve support member (12) being fastened to said sleeve member (11), an annular connecting member (14) being rotatably mounted within said sleeve support member (12) about a connecting member axis perpendicular to said sleeve support member (12) and about a connecting member axis perpendicular to said sleeve member axis, said annular connecting member (14) being rotatable but axially and radially fixed with respect to said sleeve support member (12) along said connecting member axis, said annular connecting member (14) having internal thread means (15) and being provided with a radially outwardly directed flange (39) in axial engagement with a shoulder face (38) of a bore (13) of said sleeve support member (12) wherein said internal thread means (15) of said annular connecting member (14) is in engagement with external thread means (2) provided at the other end of the damping cylinder unit thereby allowing said damper cylinder unit to be horizontally adjustable with respect to said sleeve support member and sleeve member.

* * * * *

UNITED STATES PATENT AND TRADEMARK OFFICE
CERTIFICATE OF CORRECTION

PATENT NO. : 4,900,076

DATED : February 13, 1990

INVENTOR(S) : Wolfgang Kolb

It is certified that error appears in the above-identified patent and that said Letters Patent is hereby corrected as shown below:

Col. 1, line 40, "prependicular" should read --perpendicular--;
Col. 2, line 49, "wit" should read --with--;
Col. 3, line 44, "aces" should read --faces-.
Col. 5, line 2, "(21)" should read --(20)--;
Col. 6, line 6, "is" should read --are--.

Signed and Sealed this

Twenty-third Day of April, 1991

Attest:

HARRY F. MANBECK, JR.

*Attesting Officer*   *Commissioner of Patents and Trademarks*